(12) United States Patent
Wu et al.

(10) Patent No.: US 9,395,935 B1
(45) Date of Patent: Jul. 19, 2016

(54) INTER-STORAGE PROCESSOR STORAGE POOL JOB STATUS COMMUNICATION

(71) Applicant: EMC Corporation, Hopkinton, MA (US)

(72) Inventors: Yuanjie Wu, Shanghai (CN); Rongzhang Wu, Shanghai (CN); Xiao Hua Fan, Shanghai (CN); Brian K. Robideau, Bellingham, MA (US)

(73) Assignee: EMC Corporation, Hopkinton, MA (US)

( * ) Notice: Subject to any disclaimer, the term of this patent is extended or adjusted under 35 U.S.C. 154(b) by 28 days.

(21) Appl. No.: 14/150,249

(22) Filed: Jan. 8, 2014

(51) Int. Cl.
*G06F 9/50* (2006.01)
*G06F 3/06* (2006.01)

(52) U.S. Cl.
CPC ............ *G06F 3/0665* (2013.01); *G06F 3/0604* (2013.01); *G06F 3/067* (2013.01); *G06F 9/5022* (2013.01); *G06F 9/50* (2013.01); *G06F 9/5016* (2013.01); *G06F 9/5061* (2013.01)

(58) Field of Classification Search
CPC ....... G06F 9/50; G06F 9/5022; G06F 9/5061; G06F 9/5016
USPC .................................................. 711/153, 156
See application file for complete search history.

(56) References Cited

U.S. PATENT DOCUMENTS

| 7,278,005 B1* | 10/2007 | Wolf et al. .................... 711/170 |
| 8,346,735 B1* | 1/2013 | Tang et al. .................... 707/675 |
| 2009/0249017 A1* | 10/2009 | Prebble ......................... 711/170 |
| 2011/0179263 A1* | 7/2011 | Eguchi ............................. 713/2 |
| 2014/0046908 A1* | 2/2014 | Patiejunas et al. ............. 707/687 |
| 2015/0081624 A1* | 3/2015 | Masse et al. .................. 707/608 |
| 2015/0134904 A1* | 5/2015 | Goodman et al. ............ 711/114 |

* cited by examiner

*Primary Examiner* — Than Nguyen
(74) *Attorney, Agent, or Firm* — Proskauer Rose LLP

(57) ABSTRACT

Described are methods, systems, and apparatus for communicating the status of storage pool job status between storage processors. A storage pool command is received by the secondary storage processor. The storage pool command is provided, by the secondary storage processor, to the primary storage processor. A storage pool job based on the storage pool command is created by the primary storage processor. The storage pool job is submitted, by the primary storage processor, to a job execution engine, for execution. A storage pool job submission notification is provided, by the primary storage processor, to the secondary storage processor. A storage pool job execution acknowledgement is provided, by the primary storage processor, to the secondary storage processor. The storage pool job is executed by the primary storage processor. One or more storage pool job status notifications are provided, by the primary storage processor, to the secondary storage processor.

20 Claims, 3 Drawing Sheets

INTER-STORAGE PROCESSOR STORAGE POOL JOB STATUS COMMUNICATION

FIELD OF THE TECHNOLOGY

The present technology relates generally to storage systems and, more specifically, to communicating the status of storage pool job status between storage processors.

BACKGROUND

Storage systems can permit users to provision and/or destroy storage pools (e.g., physical storage allocated for use by hosts to store and retrieve data). In some storage systems, provisioning and/or destroying storage pools can be long-running. To allow the storage management interfaces to remain responsive, storage systems can provision and/or destroy storage pools asynchronously, instead of locking the storage management interface while the provisioning and/or destroying completes. In some applications, a storage system can include a primary storage processor and one or more secondary storage processors that receive (e.g., from storage system management interfaces) commands to provision and/or destroy storage pools. While the primary and secondary storage processors can receive commands to provision and/or destroy storage pools, the primary storage processor executes the provisioning and/or destruction of storage pools. In some applications, the storage system management interfaces can connect to the secondary storage processors to attempt to obtain status information about the provisioning and/or destruction of storage pools.

SUMMARY OF THE TECHNOLOGY

Accordingly, there is a need to provide status information about storage pool operations to secondary storage processors, for example, so that the storage system management interfaces connected to the secondary storage processors can obtain status information about provisioning and/or destruction of storage pools.

In an aspect, there is a method performed by a storage system including a primary storage processor and a secondary storage processor. The method includes receiving, by the secondary storage processor, a storage pool command. The method includes providing, by the secondary storage processor, to the primary storage processor, the storage pool command. The method includes creating, by the primary storage processor, a storage pool job based on the storage pool command. The method includes submitting, by the primary storage processor, to a job execution engine, the storage pool job for execution. The method includes providing, by the primary storage processor, to the secondary storage processor, a storage pool job submission notification. The method includes providing, by the primary storage processor, to the secondary storage processor, a storage pool job execution acknowledgement. The method includes executing, by the primary storage processor, the storage pool job. The method includes providing, by the primary storage processor, to the secondary storage processor, one or more storage pool job status notifications.

In some embodiments, the storage pool command includes one of a storage pool creation command, a storage pool expansion command, and a storage pool destruction command. In some embodiments, the method includes providing, by the secondary storage processor, to the primary storage processor, via an inter-storage processor communication channel, the storage pool command. In some embodiments, the method includes providing, by the primary storage processor, to the secondary storage processor, via an inter-storage processor communication channel, the storage pool job execution acknowledgement. In some embodiments, the method includes providing, by the primary storage processor, to the secondary storage processor, via an inter-storage processor communication channel, the storage pool job submission notification. In some embodiments, the method includes providing, by the primary storage processor, to the secondary storage processor, via persistent storage, the one or more storage pool job status notifications. In some embodiments, the storage pool job execution acknowledgement is provided before executing the storage pool job.

In another aspect, there is a storage system. The storage system includes a primary storage processor. The storage system includes a secondary storage processor, wherein the secondary storage processor is configured to receive a storage pool command; and provide, to the primary storage processor, the storage pool command. In some embodiments, the primary storage processor is configured to create a storage pool job based on the storage pool command; submit to a job execution engine, the storage pool job for execution; provide, to the secondary storage processor, a storage pool job submission notification; provide, to the secondary storage processor, a storage pool job execution acknowledgement; execute the storage pool job; and provide, to the secondary storage processor, one or more storage pool job status notifications.

In some embodiments, the storage pool command includes one of a storage pool creation command, a storage pool expansion command, and a storage pool destruction command. In some embodiments, the storage system includes an inter-storage processor communication channel; and the secondary storage processor is further configured to provide, to the primary storage processor, via the inter-storage processor communication channel, the storage pool command. In some embodiments, the storage system includes an inter-storage processor communication channel; and the primary storage processor is further configured to provide, to the secondary storage processor, via the inter-storage processor communication channel, the storage pool job execution acknowledgement. In some embodiments, the storage system includes an inter-storage processor communication channel; and the primary storage processor is further configured to provide, to the secondary storage processor, via the inter-storage processor communication channel, the storage pool job submission notification. In some embodiments, the storage system includes persistent storage, and the primary storage processor is further configured to provide, to the secondary storage processor, via the persistent memory, the one or more storage pool job status notifications. In some embodiments, the primary storage processor is further configured to provide the storage pool job execution acknowledgement before executing the storage pool job.

In another aspect, there is a computer program product, tangibly embodied in a non-transitory computer readable storage medium, including instructions being operable to cause a storage system to: receive, by a secondary storage processor, a storage pool command; provide, by the secondary storage processor, to a primary storage processor, the storage pool command; create, by the primary storage processor, a storage pool job based on the storage pool command; submit, by the primary storage processor, to a job execution engine, the storage pool job for execution; provide, by the primary storage processor, to the secondary storage processor, a storage pool job submission notification; provide, by the primary storage processor, to the secondary storage processor, a storage pool job execution acknowledgement; execute, by the primary storage processor, the storage pool job; and provide, by the primary storage processor, to the secondary storage processor, one or more storage pool job status notifications.

In some embodiments, the storage pool command includes one of a storage pool creation command, a storage pool expansion command, and a storage pool destruction command. In some embodiments, the computer program includes instructions being operable to cause the storage system to: provide, by the secondary storage processor, to the primary storage processor, via an inter-storage processor communication channel, the storage pool command. In some embodiments, the computer program includes instructions being operable to cause the storage system to: provide, by the primary storage processor, to the secondary storage processor, via an inter-storage processor communication channel, the storage pool job execution acknowledgement. In some embodiments, the computer program includes instructions being operable to cause the storage system to: provide, by the primary storage processor, to the secondary storage processor, via an inter-storage processor communication channel, the storage pool job submission notification. In some embodiments, the computer program includes instructions being operable to cause the storage system to: provide, by the primary storage processor, to the secondary storage processor, via persistent storage, the one or more storage pool job status notifications.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In some applications of the technology, the technology can facilitate communicating the status of storage pool job status between storage processors. According to embodiments of the technology, a secondary storage processor can receive a command to perform a storage pool operation. Some storage systems execute certain storage pool operations (e.g., provisioning and/or destruction of storage pools) on the primary storage processor. The secondary storage processor can provide the storage pool command to the primary storage processor for execution. The primary storage processor can provide status information about the processing of the storage pool command. For example, the primary storage processor can provide to the secondary storage processor a storage pool job submission notification after the storage pool job (e.g., a storage pool job created to execute the storage pool command) has been submitted for execution. The primary storage processor can provide to the secondary storage processor a storage pool command execution acknowledgement (e.g., indicating that the primary storage processor has begun executing the storage pool job). While the storage pool job is executing, the primary storage processor can provide to the secondary storage processor storage pool job status notifications (e.g., the status of the job, the percentage of the job's completion, error, warnings, etc.). Beneficially, the technology can reduce the periods of time when the secondary storage processor cannot obtain current information about the storage pool job.

Figure 1:
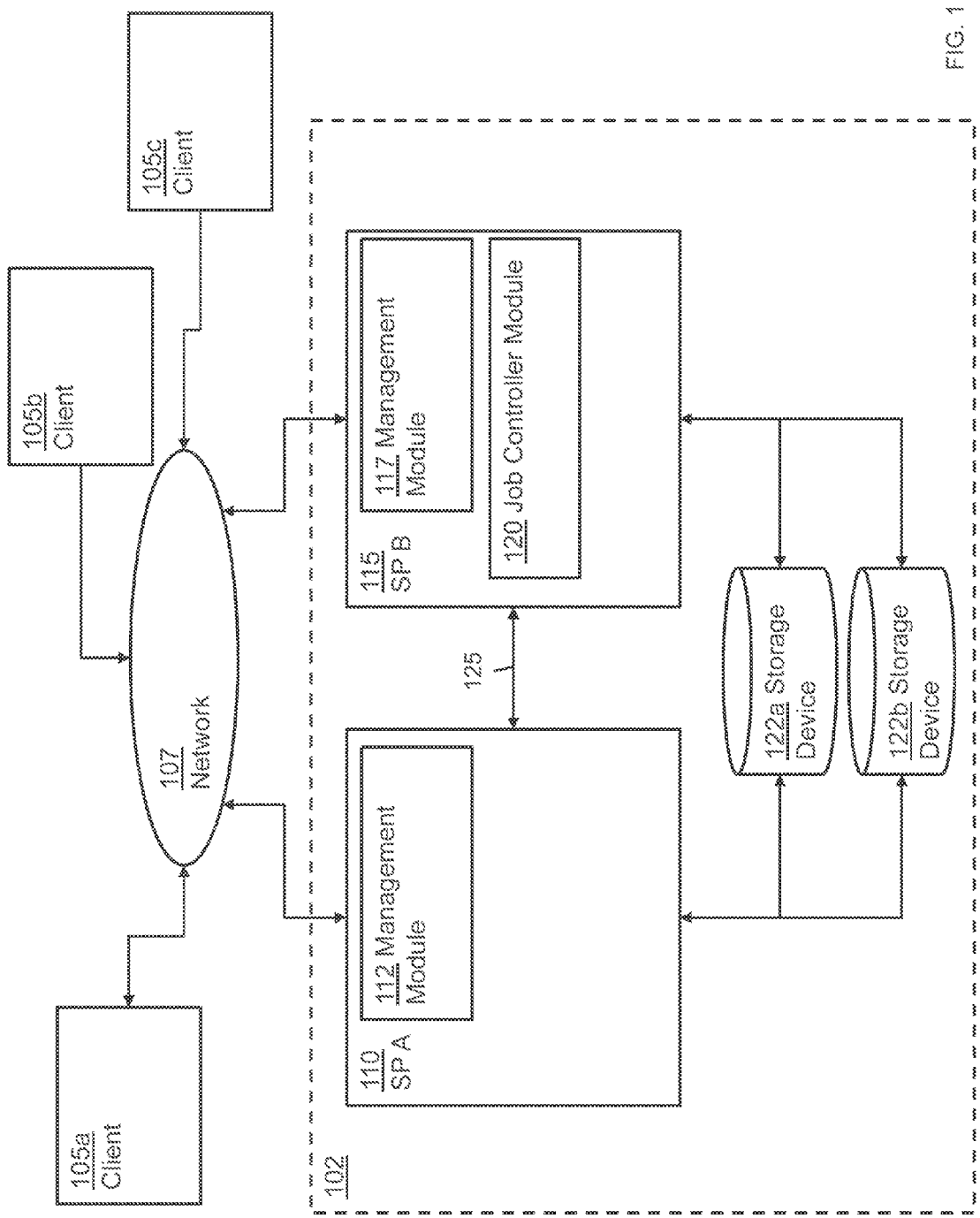
FIG. 1 depicts a storage system, clients, and network in accordance with the technology.

FIG. 1 depicts storage system 102, clients 105, and network 107 in accordance with the technology. Storage system 102 and clients 105 are connected to and can communicate via network 107. Storage system 102 includes secondary storage processor 110. Secondary storage processor 110 can include management module 112. Storage system 102 can include primary storage processor 115. Primary storage processor 115 can include storage management module 117 and job controller module 120. Clients 105 can be computing devices, such as PCs running storage system management software. Clients 105 can be any computing device that can communicate with storage system 102. Storage system 102 includes storage devices 122. Storage devices 122 can be, for example, disks, disk enclosures, etc. It should be appreciated that storage system 102 is an exemplary embodiment of the technology. The technology can be implemented on storage systems with different configurations (e.g., a storage system can include additional storage processors).

Clients 105 can connect to secondary storage processor 110 or primary storage processor 115 to provide storage pool commands. In some applications, storage pool commands (or a subset of storage pool commands) are executed on primary storage processor 115. If a storage pool command is received by secondary storage processor 110, secondary storage processor 110 can provide the storage pool command to primary storage processor 115 for execution via inter-storage processor communication channel 125.

Figure 2:
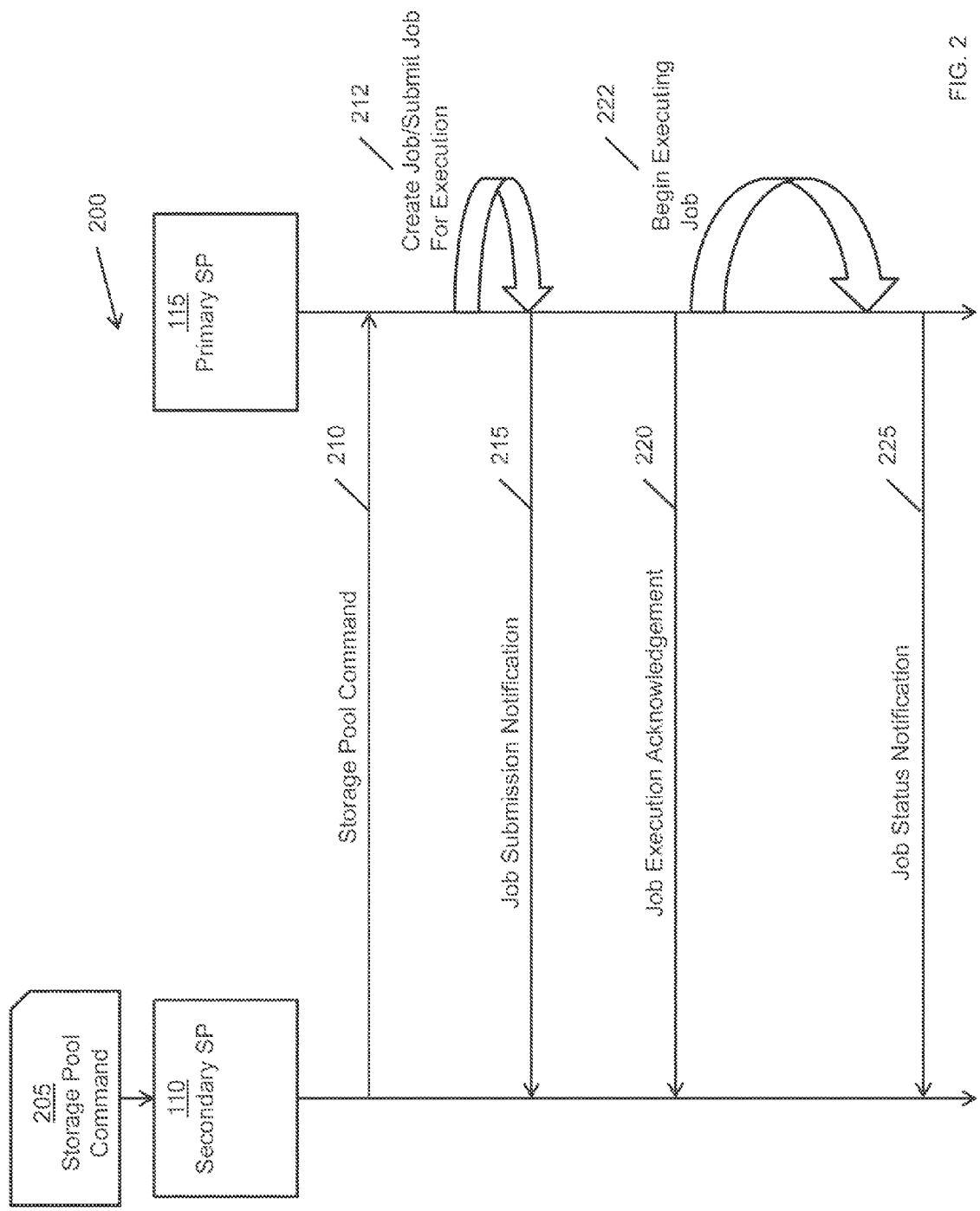
FIG. 2 depicts a data flow chart illustrating communications between a secondary storage processor and a primary storage processor in accordance with the technology.

FIG. 2 depicts data flow chart 200 illustrating communications between secondary storage processor 110 and primary storage processor 115 in accordance with the technology. FIG. 2 is described with reference to storage system 102 of FIG. 1 as an example of the operation of an embodiment of the technology. It should be appreciated that the technology can be implemented on other storage system configurations. Secondary storage processor 110 can receive storage pool command 205. For example, management module 112 on secondary storage processor 110 can receive a command to create a storage pool with resources from storage device 122a and/or storage device 112b. Storage pool command 205 can be received from, e.g., client 105a, client 105b, or client 105c. Secondary storage processor 110 can provide storage pool command 205 to primary storage processor 115 (communication step 210). For example, secondary storage processor 110 can provide storage pool command 205 to primary storage processor 115 via inter-storage processor communication channel 125.

Primary storage processor 115 can create a job based on storage pool command 205 (processing step 212). For example, in the case of a command to create a storage pool, the job can include the processing steps that primary storage processor 115 can perform to create the storage pool. In some embodiments, the job can include the processing steps that primary storage processor 115 performs to effectuate storage pool command 205 (e.g., the steps performed to create, expand, or destroy a storage pool). In some embodiments, the job is an instance of a job object created by primary storage processor 115. Primary storage processor 115 can submit the job for execution by job controller module 120. Job controller module 120 can, for example, receive job objects and schedule their execution. In some embodiments, jobs submitted to job controller module 120 can be executed shortly after submission. In some embodiments, jobs submitted to job controller module 120 can be executed after a delay (e.g., when previously submitted jobs have not completed yet). After the job has been submitted to job controller module 120, primary storage processor 115 can provide a job submission notification to secondary storage processor 110 (communication step 215). For example, primary storage processor 115 can provide the job submission notification to secondary storage processor 110 via inter-storage processor communication channel 125. Primary storage processor 115 can provide a storage pool job execution acknowledgement to secondary storage processor 110 (communication step 220). For example, the storage pool acknowledgement can indicate to secondary storage processor 110 that primary storage processor 115 has begun executing the job created based on storage pool command 205. Primary storage processor 115 can begin executing the job (processing step 222). For example, in the case of a storage pool creation, primary storage processor 115 can begin creating the storage pool. Primary storage processor 115 can provide job status notifications to secondary storage processor 110 during execution of the job (communication step 225). In some embodiments, primary storage processor 115 can store status information about the execution of a job to persistent memory accessible by both primary storage processor 115 and secondary storage processor 110 (e.g., the status information can be stored on storage device 122*a* or storage device 122*b*).

Figure 3:
FIG. 3 is a flowchart illustrating a method in accordance with the technology.

FIG. 3 is a flowchart 300 illustrating a method in accordance with the technology. At step 310, the secondary storage processor receives a storage pool command. At step 315, the secondary storage processor provides, to the primary storage processor, the storage pool command. At step 320, the primary storage processor creates a storage pool job based on the storage pool command. At step 325, the primary storage processor submits, to the job execution engine, the storage pool job for execution. At step 330, the primary storage processor provides, to the secondary storage processor, a storage pool job submission notification. At step 335, the primary storage processor provides, to the secondary storage processor, a storage pool job execution acknowledgement. At step 340, the primary storage processor executes the storage pool job. At step 345, the primary storage processor provides, to the secondary storage processor, one or more storage pool job status notifications.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a storage system comprising a primary storage processor and a secondary storage processor, the method comprising:
   receiving, by the secondary storage processor, a storage pool command;
   providing, by the secondary storage processor, to the primary storage processor, the storage pool command;
   creating, by the primary storage processor, a storage pool job based on the storage pool command;
   submitting, by the primary storage processor, to a job execution engine, the storage pool job for execution;
   providing, by the primary storage processor, to the secondary storage processor, a storage pool job submission notification;
   providing, by the primary storage processor, to the secondary storage processor, a storage pool job execution acknowledgement;
   executing, by the primary storage processor, the storage pool job; and
   providing, by the primary storage processor, to the secondary storage processor, one or more storage pool job status notifications.

2. The method of claim 1, wherein the storage pool command comprises one of a storage pool creation command, a storage pool expansion command, and a storage pool destruction command.

3. The method of claim 1 further comprising providing, by the secondary storage processor, to the primary storage processor, via an inter-storage processor communication channel, the storage pool command.

4. The method of claim 1, further comprising providing, by the primary storage processor, to the secondary storage processor, via an inter-storage processor communication channel, the storage pool job execution acknowledgement.

5. The method of claim 1, further comprising providing, by the primary storage processor, to the secondary storage processor, via an inter-storage processor communication channel, the storage pool job submission notification.

6. The method of claim 1 further comprising providing, by the primary storage processor, to the secondary storage processor, via persistent storage, the one or more storage pool job status notifications.

7. The method of claim 1, wherein the storage pool job execution acknowledgement is provided before executing the storage pool job.

8. A storage system comprising:
   a primary storage processor;
   a secondary storage processor;
   wherein the secondary storage processor is configured to receive a storage pool command; and provide, to the primary storage processor, the storage pool command; and
   wherein the primary storage processor is configured to create a storage pool job based on the storage pool command; submit to a job execution engine, the storage pool job for execution; provide, to the secondary storage processor, a storage pool job submission notification; provide, to the secondary storage processor, a storage pool job execution acknowledgement; execute the storage pool job; and provide, to the secondary storage processor, one or more storage pool job status notifications.

9. The storage system of claim 8, wherein the storage pool command comprises one of a storage pool creation command, a storage pool expansion command, and a storage pool destruction command.

10. The storage system of claim 8, further comprising:
    an inter-storage processor communication channel; and
    wherein the secondary storage processor is further configured to provide, to the primary storage processor, via the inter-storage processor communication channel, the storage pool command.

11. The storage system of claim 8, further comprising:
    an inter-storage processor communication channel; and
    wherein the primary storage processor is further configured to provide, to the secondary storage processor, via the inter-storage processor communication channel, the storage pool job execution acknowledgement.

12. The storage system of claim 8, further comprising:
    an inter-storage processor communication channel; and
    wherein the primary storage processor is further configured to provide, to the secondary storage processor, via the inter-storage processor communication channel, the storage pool job submission notification.

13. The storage system of claim 8, further comprising persistent storage, wherein the primary storage processor is further configured to provide, to the secondary storage processor, via the persistent memory, the one or more storage pool job status notifications.

14. The storage system of claim 8, wherein the primary storage processor is further configured to provide the storage pool job execution acknowledgement before executing the storage pool job.

15. A computer program product, tangibly embodied in a non-transitory computer readable storage medium, comprising instructions being operable to cause a storage system to:
    receive, by a secondary storage processor, a storage pool command;
    provide, by the secondary storage processor, to a primary storage processor, the storage pool command;
    create, by the primary storage processor, a storage pool job based on the storage pool command;
    submit, by the primary storage processor, to a job execution engine, the storage pool job for execution;
    provide, by the primary storage processor, to the secondary storage processor, a storage pool job submission notification;
    provide, by the primary storage processor, to the secondary storage processor, a storage pool job execution acknowledgement;
    execute, by the primary storage processor, the storage pool job; and
    provide, by the primary storage processor, to the secondary storage processor, one or more storage pool job status notifications.

16. The computer program product of claim 15, wherein the storage pool command comprises one of a storage pool creation command, a storage pool expansion command, and a storage pool destruction command.

17. The computer program product of claim 15, further comprising instructions being operable to cause the storage system to: provide, by the secondary storage processor, to the primary storage processor, via an inter-storage processor communication channel, the storage pool command.

18. The computer program product of claim 15, further comprising instructions being operable to cause the storage system to: provide, by the primary storage processor, to the secondary storage processor, via an inter-storage processor communication channel, the storage pool job execution acknowledgement.

19. The computer program product of claim 15, further comprising instructions being operable to cause the storage system to: provide, by the primary storage processor, to the secondary storage processor, via an inter-storage processor communication channel, the storage pool job submission notification.

20. The computer program product of claim 15, further comprising instructions being operable to cause the storage system to: provide, by the primary storage processor, to the secondary storage processor, via persistent storage, the one or more storage pool job status notifications.

* * * * *